United States Patent
Schilling

(10) Patent No.: US 8,191,352 B2
(45) Date of Patent: Jun. 5, 2012

(54) GEARED DIFFERENTIAL SPEED COUNTER-ROTATABLE LOW PRESSURE TURBINE

(75) Inventor: Jan Christopher Schilling, Middleton, OH (US)

(73) Assignee: General Electric Company, Schenectady, NY (US)

( * ) Notice: Subject to any disclaimer, the term of this patent is extended or adjusted under 35 U.S.C. 154(b) by 837 days.

(21) Appl. No.: 12/339,731

(22) Filed: Dec. 19, 2008

(65) Prior Publication Data

US 2010/0154384 A1    Jun. 24, 2010

(51) Int. Cl.
*F02K 3/072* (2006.01)

(52) U.S. Cl. ........ 60/268; 60/39.162; 60/226.1; 60/792; 60/802; 415/65; 415/69; 416/122; 416/124; 416/126; 416/128

(58) Field of Classification Search ............... 60/226.1, 60/268, 39.162, 772, 802, 792; 415/122.1, 415/65–66, 67–69; 416/122, 124, 126, 128–129, 416/170 R See application file for complete search history.

(56) References Cited

U.S. PATENT DOCUMENTS

| | | | |
|---|---|---|---|
| 3,673,802 A * | 7/1972 | Krebs et al. | 60/226.1 |
| 4,251,987 A | 2/1981 | Adamson | |
| 4,827,712 A | 5/1989 | Coplin | |
| 4,916,894 A | 4/1990 | Adamson et al. | |
| 4,969,325 A * | 11/1990 | Adamson et al. | 60/226.1 |
| 5,010,729 A * | 4/1991 | Adamson et al. | 60/226.1 |
| 6,158,210 A | 12/2000 | Orlando | |
| 7,334,392 B2 | 2/2008 | Moniz et al. | |
| 8,015,798 B2 * | 9/2011 | Norris et al. | 60/268 |
| 2007/0084187 A1 | 4/2007 | Moniz et al. | |
| 2007/0087892 A1 | 4/2007 | Orlando et al. | |

* cited by examiner

*Primary Examiner* — Ehud Gartenberg
*Assistant Examiner* — Steven Sutherland
(74) *Attorney, Agent, or Firm* — William Scott Andes; Steven J. Rosen

(57) ABSTRACT

A counter-rotatable low pressure turbine includes counter-rotatable outer and inner drum rotors. The outer drum rotor is connected to a sole shaft for transmitting torque and power out of the low pressure turbine. Low pressure outer drum turbine blade rows extend radially inwardly from an outer shell of the outer drum rotor. Low pressure inner drum turbine blade rows extend radially outwardly from the low pressure inner drum rotor. The outer drum turbine blade rows are interdigitated with the inner drum turbine blade rows. The drum rotors are geared together through an epicyclic gearbox for transmitting all the torque and power produced by the drum rotors to the shaft. The gearbox may be located aft of the drum rotors. A differential thrust bearing is disposed between the drum rotors. A single stage fan section of an engine is connected to the turbine by the shaft.

30 Claims, 3 Drawing Sheets

GEARED DIFFERENTIAL SPEED COUNTER-ROTATABLE LOW PRESSURE TURBINE

BACKGROUND OF THE INVENTION

1. Field of the Invention

The invention relates to aircraft gas turbine engines with counter-rotatable low pressure turbines and, particularly, for such engines having geared together counter-rotatable low pressure turbines.

2. Description of Related Art

Conventional gas turbine engines of the turbofan type generally include a forward fan and booster compressor, a middle core engine, and an aft low pressure power turbine. The core engine includes a high pressure compressor, a combustor, and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Some fan jet engines have been designed with counter-rotatable turbines that power counter-rotatable fans and boosters or low pressure compressors. U.S. Pat. Nos. 4,790,133, 4,860,537, 5,307,622 and 6,732,502 disclose counter-rotatable low pressure turbines (LPT) that power counter-rotatable fans and booster or low pressure compressors.

Counter-rotatable fans are noisy and to alleviate the noise problem and retain inherent efficiency of the counter-rotatable low pressure turbines, various designs have been developed with a single stage fan using gearboxes between the counter-rotatable low pressure turbines to drive the single stage fan. One such engine, described in U.S. Pat. No. 4,969,325, discloses counter-rotatable low pressure turbines having concentric shafts running forward to the fan and geared together by a gearbox in a fan section of the engine forward of the high pressure compressor of the core engine. The difficulty in design and construction and costs associated with two counter-rotatable low pressure concentric shafts running forward to the fan and geared together by a gearbox in a fan section of the engine forward of the high pressure compressor of the core engine is very well appreciated by those skilled in the art.

Another engine, described in U.S. Pat. No. 7,451,592, discloses single stage counter-rotatable low pressure turbines geared together by a gearbox in a rear section of the engine aft of the core engine and the aft of the single stage counter-rotatable low pressure turbines. A single shaft runs forward to power the fan. However, among the drawbacks of this design are the large exit areas of the single stage counter-rotatable low pressure turbines. The large exit areas of the single stage counter-rotatable low pressure turbines also requires large radius low pressure turbine sections which are also highly undesirable.

SUMMARY OF THE INVENTION

A gas turbine engine counter-rotatable low pressure turbine includes counter-rotatable annular outer and inner drum rotors. The outer drum rotor is rotatably connected to a low pressure shaft which is the sole shaft operable for transmitting torque and power out of the low pressure turbine. A plurality of axially spaced apart low pressure outer drum turbine blade rows extend radially inwardly from an outer shell of the outer drum rotor and a plurality of axially spaced apart low pressure inner drum turbine blade rows extend radially outwardly from the annular low pressure inner drum rotor. The low pressure outer drum turbine blade rows are interdigitated with the low pressure inner drum turbine blade rows. The outer and inner drum rotors are geared together through an epicyclic gearbox for transmitting all the torque and power produced by the inner drum rotor to the low pressure shaft. All the torque and power produced by the outer drum rotor is directly transmitted to the low pressure shaft.

An exemplary embodiment of the low pressure turbine includes the a differential thrust bearing operably disposed between the outer and inner drum rotors. The gearbox is located aft of the outer and inner drum rotors. The gearbox having planetary gears rotatably mounted on pins supported by the turbine rear frame. The gearbox includes a sun gear meshed with and rotatably mounted radially inwardly of the planetary gears, a ring gear meshed with and rotatably mounted radially outwardly of the planetary gears, the outer drum rotor connected to the ring gear, and the inner drum rotor connected to the sun gear. A radially outer roller bearing is disposed between the inner drum rotor and the turbine rear frame and a radially inner differential roller bearing disposed between outer and inner drum rotors. The pins are cantilevered off an annular carrier supported by the turbine rear frame.

An aircraft gas turbine engine having a single stage fan section with a single fan stage having a single fan blade row may incorporate the counter-rotatable low pressure turbine for drivingly the single fan stage through the low pressure shaft.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
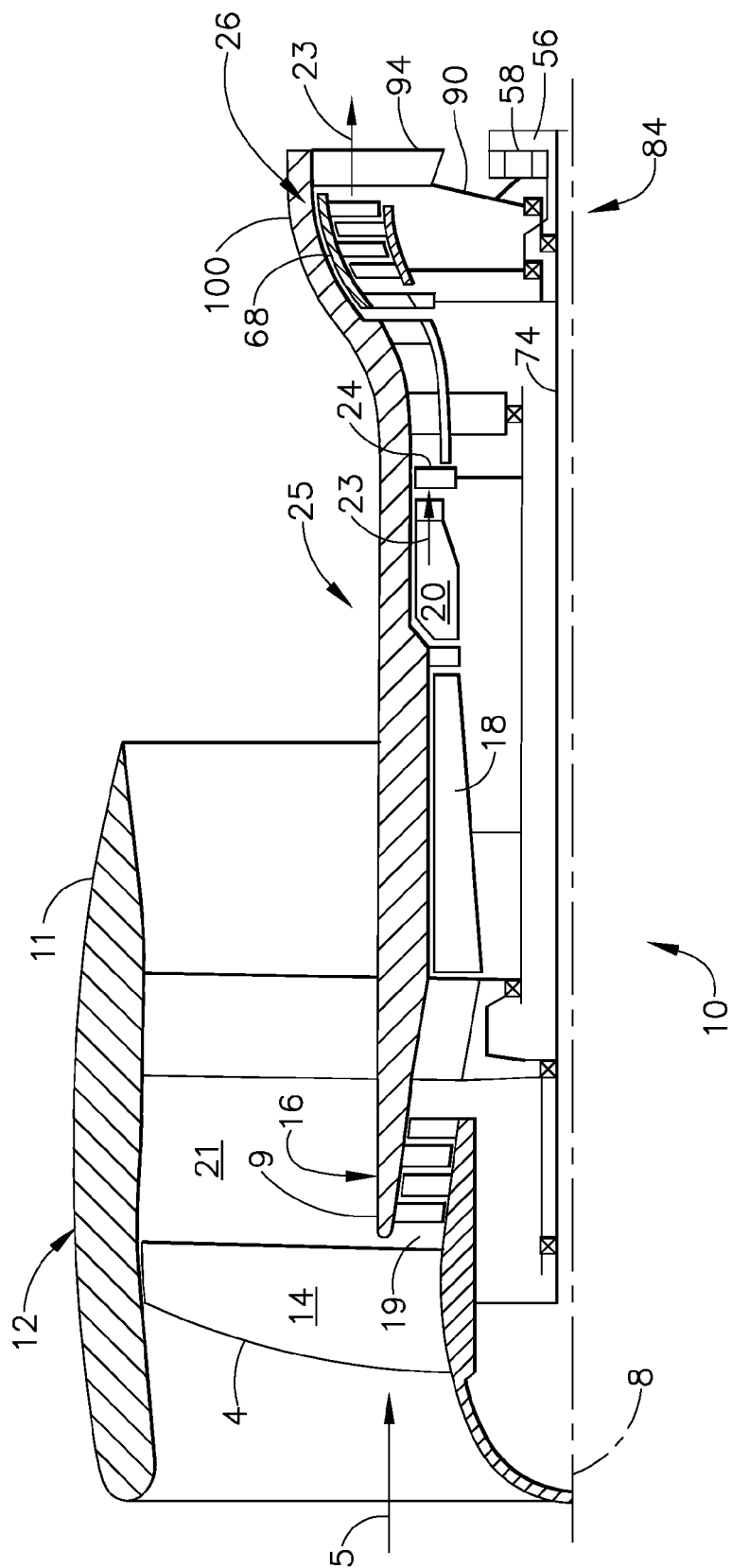
FIG. 1 is a longitudinal sectional view illustration of an exemplary embodiment of an aircraft turbofan gas turbine engine and a single fan stage and multiple stage counter-rotatable first and second low pressure turbines geared together by an aft mounted gearbox.

Illustrated in FIG. 1 is an exemplary turbofan gas turbine engine 10 circumscribed about an engine centerline 8 and having a single stage fan section 12 which receives inlet airflow of ambient air 5. The fan section 12 has a single fan stage 4 including a single fan blade row 14. A booster 16 is downstream of the fan stage 4. A bypass duct 21 radially bounded by a fan casing 11 and an annular radially inner bypass duct wall 9 surrounds the booster 16 and a core engine inlet duct 19 to a core engine 25. The core engine 25 includes in downstream serial flow relationship the high pressure compressor (HPC) 18, a combustor 20 which mixes fuel with the air 5 pressurized by the HPC 18 for generating combustion gases 23 which flow downstream through a high pressure turbine (HPT) 24. A counter-rotatable low pressure turbine (LPT) 26 receives the combustion gases 23 for powering the single fan stage 4 of the fan section 12 and then the spent combustion gases 23 are discharged from the engine 10. A high pressure shaft 27 joins the HPT 24 to the HPC 18 to substantially form a first or high pressure rotor 33. The high pressure compressor 18, combustor 20, and high pressure turbine 24 collectively are referred to as the core engine 25 for the purposes of this patent.

Figure 2:
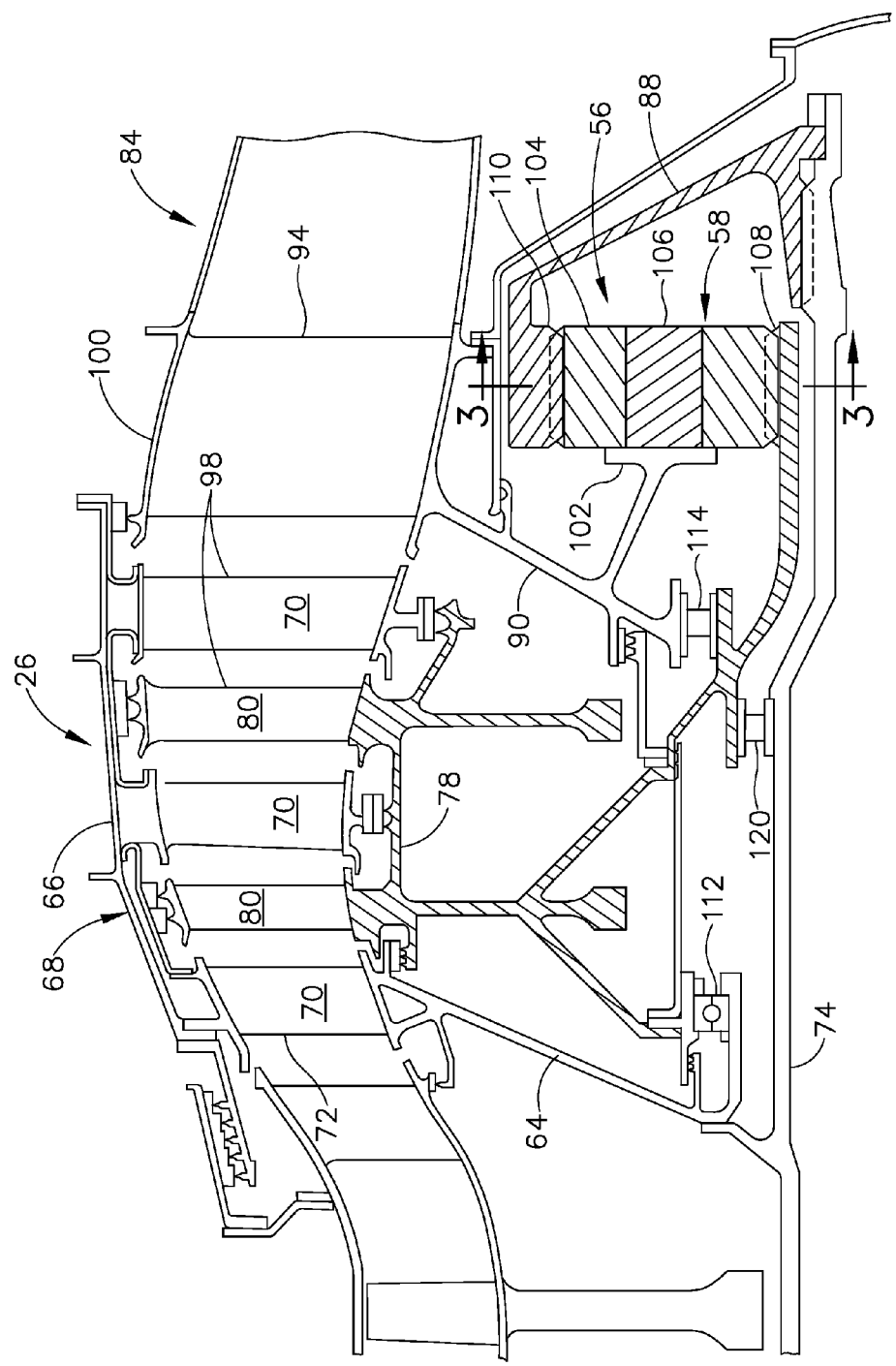
FIG. 2 is an enlarged longitudinal sectional view illustration of the multiple stage counter-rotatable first and second low pressure turbines and gearbox illustrated in FIG. 1.

Referring further to FIG. 2, the counter-rotatable low pressure turbine 26 includes an annular outer drum rotor 68 rotatably connected to a low pressure shaft 74 by a low pressure outer web 64. The low pressure shaft 74 is the sole and only shaft used and operable for transmitting torque and power out of the low pressure turbine 26. A plurality of axially spaced apart low pressure outer drum turbine blade rows 70 extend radially inwardly from an outer shell 66 of the outer drum rotor 68. The outer shell 66 is cantilevered off of a first stage 72 of the low pressure outer drum turbine blade rows 70 and the first stage 72 is rotatably connected to the low pressure shaft 74. The low pressure shaft 74 is drivingly connected to the single fan stage 4 of the fan section 12.

The counter-rotatable low pressure turbine 26 further includes an annular low pressure inner drum rotor 78. The inner drum rotor 78 includes a plurality of axially spaced apart low pressure inner drum turbine blade rows 80 extending radially outwardly from the inner drum rotor 78. The low pressure outer drum turbine blade rows 70 are interdigitated with the low pressure inner drum turbine blade rows 80. The low pressure turbine 26 is illustrated herein as having three low pressure outer drum turbine blade rows 70 and two low pressure inner drum turbine blade rows 80. The number of interdigitated outer and inner drum turbine blade rows 70, 80 may be varied according to design requirements of the engine 10 including fan speed and gear ratio.

The inner drum rotor 78 is geared through a reduction epicyclic gearbox 56 containing epicyclic gears 58 located in an aft end 84 of the engine 10 and aft of the high pressure turbine 24 of the core engine 25. The outer and inner drum rotors 68, 78 are operably geared together through the epicyclic gears but only the torque of the inner drum rotor 78 is transmitted to the low pressure shaft 74. The gearbox 56 is mounted in or to a turbine rear frame 90 which is connected by turbine struts 94 to an outer turbine casing 100. Thus, the gearbox 56 is located aft of the outer and inner drum rotors 68, 78.

Figure 3:
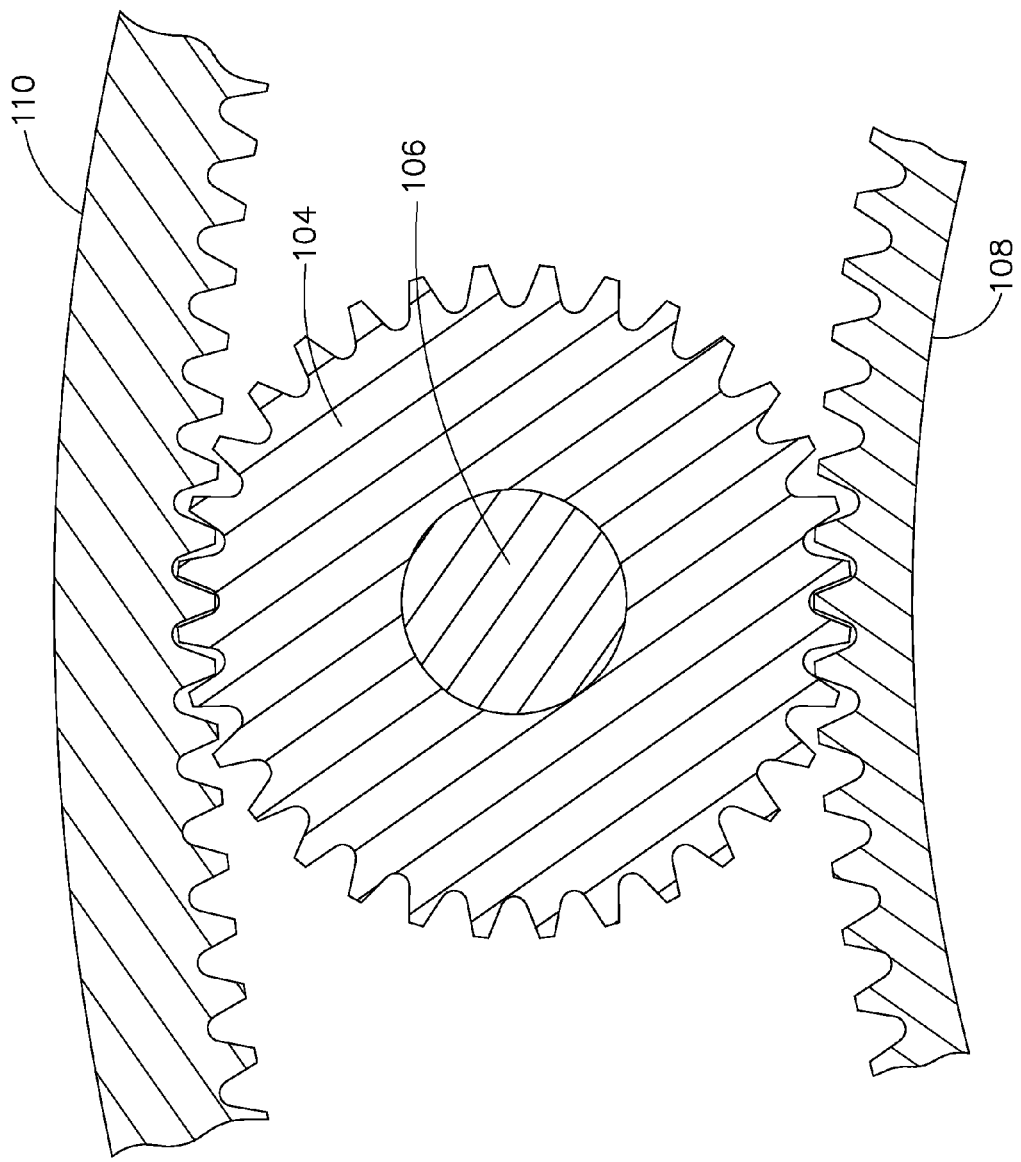
FIG. 3 is a sectional view illustration of epicyclic gears of the gearbox taken through 3-3 in FIG. 2.

Referring to FIGS. 2 and 3, the gearbox 56 includes an annular carrier 102 supported by the turbine rear frame 90 and planetary gears 104 rotatably mounted on pins 106 cantilevered off the annular carrier 102. A sun gear 108 is meshed with and rotatably mounted radially inwardly of the planetary gears 104 and a ring gear 110 is meshed with and rotatably mounted radially outwardly of the planetary gears 104. The outer drum rotor 68 is connected by the aft conical shaft extension 88 of the low pressure shaft 74 to the ring gear 110. The inner drum rotor 78 is connected to the sun gear 108. Thus, the torque and work of the inner drum rotor 78 is transmitted to the low pressure shaft 74. This torque coupled with torque produced by the outer drum rotor 68, directly attached to the low pressure shaft 74 through low pressure outer web 64, drives the fan stage 4.

A differential thrust bearing 112 operably disposed between the outer and inner drum rotors 68, 78 keeps both the outer and inner drum rotors together for improved operating axial clearances between outer and inner drum turbine blade rows 70, 80. Operational radial clearances are improved between the outer and inner drum rotors 68, 78 since both rotors are spinning. The gearbox arrangement provides for outer drum rotor 68 to rotate at a lower rotational speed than the inner drum rotor 78. The torque of the higher speed inner drum rotor 78 is transferred through the gearbox and the torque of the lower speed outer drum rotor 68 is transferred directly to the low pressure inner shaft 62, thus, reducing the overall gearbox torque and resultant heat load resulting in an improved weight/fuel burn system. A single shaft delivering torque and power to the fan and together with a differential thrust bearing tying both LPT turbines together eliminates the need for thrust balance systems and larger fan thrust bearings, thus, improving weight, reducing complexity, and improving fuel burn of the engine. The differential thrust bearing 112 allows smaller axial clearances between the lower rotational speed outer drum rotor 68 and the higher speed inner drum rotor 78 resulting in improved LPT performance and improved fuel burn.

The outer and inner drum rotors 68, 78 are radially and rotatably supported by the turbine rear frame 90. A radially outer roller bearing 114 is disposed between the inner drum rotor 78 and the turbine rear frame 90. A radially inner differential roller bearing 120 is disposed between outer and inner drum rotors 68, 78.

A family of engines 10 may be built having a common or same counter-rotatable low pressure turbine (LPT) 26 with common outer and inner drum rotors 68, 78. Different engine models within the family have different size fans and/or operational design fan speeds and different gearboxes 56 with different gear ratios respectively for maintaining the same relative differential speed between the outer and inner drum turbine blade rows 70, 80 in each of the engine models. This allows engines with different engines within the family to have different size fans and/or operational design fan speeds to accommodate different size fan and/or fan speed without changing airfoils 98 in the outer and inner drum turbine blade rows 70, 80 for the different engines within the same family.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine counter-rotatable low pressure turbine comprising:

counter-rotatable annular outer and inner drum rotors, the outer drum rotor rotatably connected to a low pressure shaft wherein the low pressure shaft is the sole shaft operable for transmitting torque and power out of the low pressure turbine, a plurality of axially spaced apart low pressure outer drum turbine blade rows extending radially inwardly from an outer shell of the outer drum rotor, the low pressure inner drum rotor including a plurality of axially spaced apart low pressure inner drum turbine blade rows extending radially outwardly from the annular low pressure inner drum rotor, the low pressure outer drum turbine blade rows being interdigitated with the low pressure inner drum turbine blade rows, and the inner drum rotor being geared through an epicyclic gearbox for transmitting torque and power produced by the inner drum rotor to the low pressure shaft.

2. A low pressure turbine as claimed in claim 1, further comprising a differential thrust bearing operably disposed between the outer and inner drum rotors.

3. A low pressure turbine as claimed in claim 2, further comprising the gearbox being located aft of the outer and inner drum rotors.

4. A low pressure turbine as claimed in claim 3, further comprising the gearbox having planetary gears rotatably mounted on pins supported by a turbine rear frame.

5. A low pressure turbine as claimed in claim 4, further comprising:
the gearbox including a sun gear meshed with and rotatably mounted radially inwardly of the planetary gears,
a ring gear meshed with and rotatably mounted radially outwardly of the planetary gears,
the outer drum rotor being connected to the ring gear, and
the inner drum rotor being connected to the sun gear.

6. A low pressure turbine as claimed in claim 5, further comprising a radially outer roller bearing disposed between the inner drum rotor and the turbine rear frame and a radially inner differential roller bearing disposed between outer and inner drum rotors.

7. A low pressure turbine as claimed in claim 6, further comprising the pins cantilevered off an annular carrier supported by the turbine rear frame.

8. A low pressure turbine as claimed in claim 2, further comprising:
the gearbox including a sun gear meshed with and rotatably mounted radially inwardly of the planetary gears,
a ring gear meshed with and rotatably mounted radially outwardly of the planetary gears,
the outer drum rotor being connected to the ring gear, and
the inner drum rotor being connected to the sun gear.

9. A low pressure turbine as claimed in claim 8, further comprising the gearbox being located aft of the outer and inner drum rotors.

10. A low pressure turbine as claimed in claim 9, further comprising a radially outer roller bearing disposed between the inner drum rotor and a turbine rear frame and a radially inner differential roller bearing disposed between outer and inner drum rotors.

11. An aircraft gas turbine engine comprising:
a single stage fan section having a single fan stage having a single fan blade row,
a counter-rotatable low pressure turbine drivingly connected to the single fan stage by a low pressure shaft,
the counter-rotatable low pressure turbine including counter-rotatable annular outer and inner drum rotors,
the outer drum rotor rotatably connected to the low pressure shaft wherein the low pressure shaft is the sole shaft operable for transmitting torque and power out of the low pressure turbine,
a plurality of axially spaced apart low pressure outer drum turbine blade rows extending radially inwardly from an outer shell of the outer drum rotor, the low pressure inner drum rotor including a plurality of axially spaced apart low pressure inner drum turbine blade rows extending radially outwardly from the low pressure inner drum rotor, the low pressure outer drum turbine blade rows being interdigitated with the low pressure inner drum turbine blade rows, and the inner drum rotor being geared through an epicyclic gearbox for transmitting torque and power produced by the inner drum rotor to the low pressure shaft.

12. An engine as claimed in claim 11, further comprising a differential thrust bearing operably disposed between the outer and inner drum rotors.

13. An engine as claimed in claim 12, further comprising the gearbox being located aft of the outer and inner drum rotors.

14. An engine as claimed in claim 13, further comprising the gearbox having planetary gears rotatably mounted on pins supported by a turbine rear frame.

15. An engine as claimed in claim 14, further comprising:
the gearbox including a sun gear meshed with and rotatably mounted radially inwardly of the planetary gears,
a ring gear meshed with and rotatably mounted radially outwardly of the planetary gears,
the outer drum rotor being connected to the ring gear, and
the inner drum rotor being connected to the sun gear.

16. An engine as claimed in claim 12, further comprising:
the gearbox including a sun gear meshed with and rotatably mounted radially inwardly of the planetary gears,
a ring gear meshed with and rotatably mounted radially outwardly of the planetary gears,
the outer drum rotor being connected to the ring gear, and
the inner drum rotor being connected to the sun gear.

17. An engine as claimed in claim 16, further comprising the gearbox being located aft of the outer and inner drum rotors.

18. An engine as claimed in claim 17, further comprising the pins cantilevered off an annular carrier supported by a turbine rear frame.

19. An engine as claimed in claim 17, further comprising a radially outer roller bearing disposed between the inner drum rotor and a turbine rear frame and a radially inner differential roller bearing disposed between outer and inner drum rotors.

20. An engine as claimed in claim 19, further comprising the pins cantilevered off an annular carrier supported by the turbine rear frame.

21. An aircraft gas turbine engine family comprising:
at least two different engine models having within the family having different size fans and/or operational design fan speeds and different epicyclic gearboxes with different gear ratios respectively for maintaining the same relative differential speed between outer and inner drum turbine blade rows of a counter-rotatable low pressure turbine of the different engine models;
each of the engine models includes an aircraft gas turbine engine a single stage fan section having a single fan stage having a single fan blade row and a respective one of the different size fans and/or operational design fan speeds,
the counter-rotatable low pressure turbine drivingly connected to the single fan stage by a low pressure shaft,
the outer drum rotor rotatably connected to the low pressure shaft wherein the low pressure shaft is the sole shaft operable for transmitting torque and power out of the low pressure turbine, a plurality of axially spaced apart low pressure outer drum turbine blade rows extending radially inwardly from an outer shell of the outer drum rotor, the low pressure inner drum rotor including a plurality of axially spaced apart low pressure inner drum turbine blade rows extending radially outwardly from the low pressure inner drum rotor, the low pressure outer drum turbine blade rows being interdigitated with the low pressure inner drum turbine blade rows, and the inner drum rotor being geared through the epicyclic gearbox for transmitting torque and power produced by the inner drum rotor to the low pressure shaft.

22. An engine family as claimed in claim 21, further comprising a differential thrust bearing operably disposed between the outer and inner drum rotors.

23. An engine family as claimed in claim 22, further comprising the gearbox being located aft of the outer and inner drum rotors.

24. An engine family as claimed in claim 23, further comprising the gearbox having planetary gears rotatably mounted on pins supported by a turbine rear frame.

25. An engine family as claimed in claim 24, further comprising:

the gearbox including a sun gear meshed with and rotatably mounted radially inwardly of the planetary gears, a ring gear meshed with and rotatably mounted radially outwardly of the planetary gears, the outer drum rotor being connected to the ring gear, and the inner drum rotor being connected to the sun gear.

26. An engine family as claimed in claim 22, further comprising:

the gearbox including a sun gear meshed with and rotatably mounted radially inwardly of the planetary gears, a ring gear meshed with and rotatably mounted radially outwardly of the planetary gears, the outer drum rotor being connected to the ring gear, and the inner drum rotor being connected to the sun gear.

27. An engine family as claimed in claim 26, further comprising the gearbox being located aft of the outer and inner drum rotors.

28. An engine family as claimed in claim 27, further comprising the pins cantilevered off an annular carrier supported by a turbine rear frame.

29. An engine family as claimed in claim 27, further comprising a radially outer roller bearing disposed between the inner drum rotor and a turbine rear frame and a radially inner differential roller bearing disposed between outer and inner drum rotors.

30. An engine family as claimed in claim 29, further comprising the pins cantilevered off an annular carrier supported by the turbine rear frame.

* * * * *